(12) United States Patent
Benczedi et al.

(10) Patent No.: US 8,017,060 B2
(45) Date of Patent: Sep. 13, 2011

(54) PROCESS FOR THE PREPARATION OF EXTRUDED DELIVERY SYSTEMS

(75) Inventors: Daniel Benczedi, Plan-les-Ouates (CH); Pierre-Etienne Bouquerand, Pers-Jussy (FR); Ernst Steinboeck, Gex (FR)

(73) Assignee: Firmenich SA, Geneva (CH)

( * ) Notice: Subject to any disclaimer, the term of this patent is extended or adjusted under 35 U.S.C. 154(b) by 2254 days.

(21) Appl. No.: 10/862,466

(22) Filed: Jun. 8, 2004

(65) Prior Publication Data

US 2004/0238993 A1 Dec. 2, 2004

Related U.S. Application Data

(63) Continuation of application No. PCT/IB02/05577, filed on Dec. 19, 2002.

(30) Foreign Application Priority Data

Jan. 10, 2002 (WO) .................. PCT/IB02/00155

(51) Int. Cl.
*D01F 1/02* (2006.01)
*A23L 1/00* (2006.01)
*A23L 1/221* (2006.01)
*A23D 9/00* (2006.01)

(52) U.S. Cl. ........ 264/411; 426/516; 426/601; 426/602; 426/650

(58) Field of Classification Search .................. 264/211; 426/516, 601, 602, 650
See application file for complete search history.

(56) References Cited

U.S. PATENT DOCUMENTS

| 4,689,235 | A | | 8/1987 | Barnes et al. ................... 426/89 |
| 5,320,863 | A | * | 6/1994 | Chung et al. .................. 426/650 |
| 5,709,895 | A | | 1/1998 | Tanaka et al. ................... 426/96 |
| 6,902,756 | B2 | * | 6/2005 | Vlad ............................ 426/602 |
| 2003/0045589 | A1 | * | 3/2003 | Wulff et al. ..................... 516/53 |

FOREIGN PATENT DOCUMENTS

| EP | 0 550 067 A1 | | 7/1993 |
| EP | 1 090 647 A1 | | 4/2001 |
| EP | 1090647 A1 | * | 4/2001 |
| EP | 1 116 515 A2 | | 7/2001 |
| EP | 1116515 A2 | * | 7/2001 |
| WO | WO 85/03414 | | 8/1985 |
| WO | WO 00/25606 | | 5/2000 |
| WO | WO-00/25606 | * | 5/2000 |
| WO | WO 01/17372 A1 | | 3/2001 |
| WO | WO 01/25414 A1 | | 4/2001 |

* cited by examiner

*Primary Examiner* — Monica A Huson
*Assistant Examiner* — Michael T Piery
(74) *Attorney, Agent, or Firm* — Winston & Strawn LLP

(57) ABSTRACT

The invention describes a process for the preparation of a granular delivery system particularly useful for the controlled release of flavoring or perfuming ingredients. The process includes the steps of forming a concentrated, highly viscous emulsion of the active compound to be encapsulated, blending the latter with a hydrophilic polymer in an extruder and shaping it into a granular free flowing solid at usual storage temperatures. The process of the invention is particularly appropriate for the encapsulation of volatile molecules as it avoids any dehydration step before or after extrusion.

17 Claims, 1 Drawing Sheet

PROCESS FOR THE PREPARATION OF EXTRUDED DELIVERY SYSTEMS

CROSS-REFERENCE TO RELATED APPLICATIONS

Figure 1:
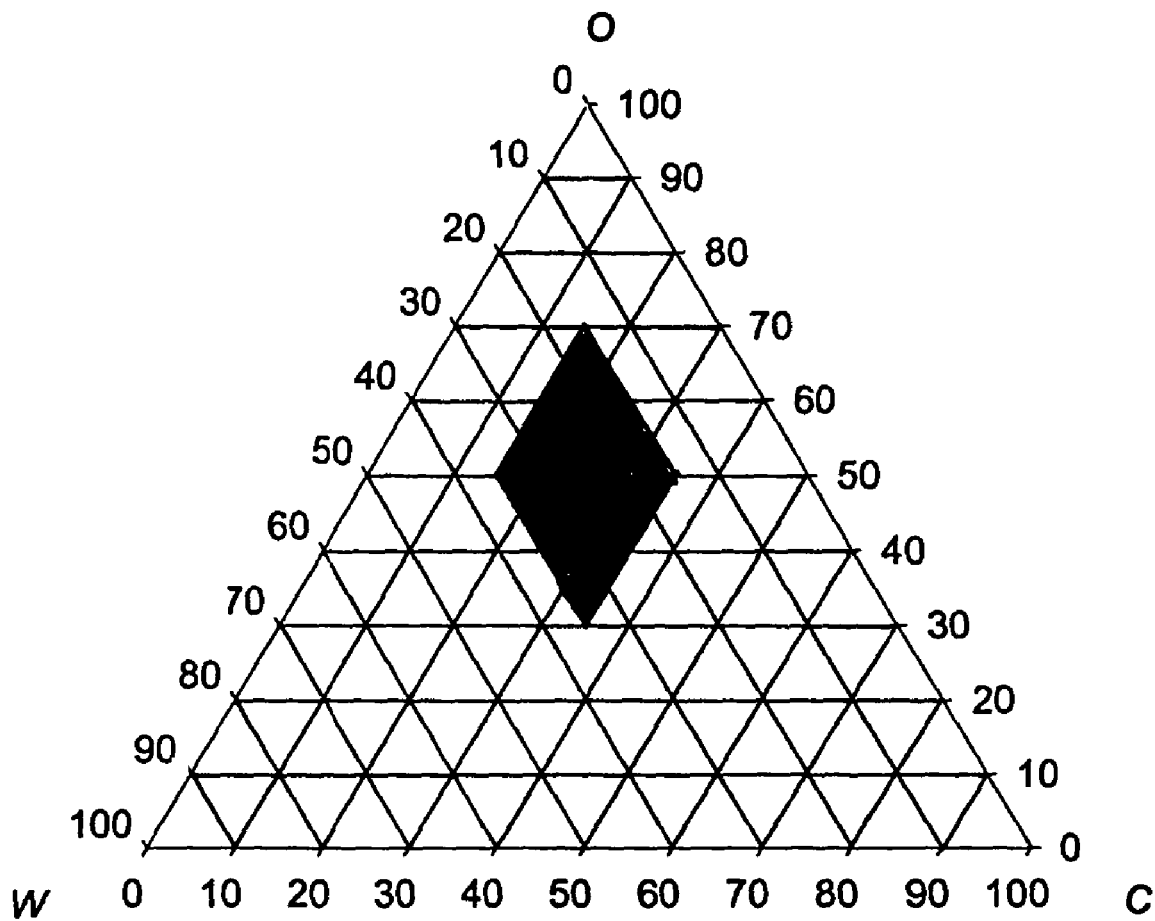

This application is a continuation of International application PCT/IB02/05577 filed Dec. 19, 2002, the entire content of which is expressly incorporated herein by reference thereto.

TECHNICAL FIELD AND BACKGROUND ART

The present invention relates to the field of encapsulation. It concerns more particularly an improved process for the preparation of an extruded product which encapsulates an active hydrophobic ingredient such as, for instance, a flavor or fragrance ingredient or composition. The process of the invention advantageously avoids any dehydration step before or after extrusion, thus improving the retention of such active ingredient during the entire process and in the final product.

In the flavor and perfume industry, extrusion is a widely used process for encapsulating active ingredients known to be volatile and labile. The flavor industry in particular is well fitted with a rich literature, notably patents, related to extrusion processes used for the preparation of encapsulated flavoring ingredients or compositions. This industry constantly seeks improvements for such processes and the products there-obtained, in terms of increase of the flavor retention, or of better control of the release of active ingredients from the finished products. In essence, the literature in the field of the invention discloses the encapsulation of flavor materials in glassy polymeric materials.

The concept of glass transition temperature (Tg) is well described in the literature in particular in relation to polymers. It represents the transition temperature of a molecular system from a rubbery (liquid) visco-elastic state to a glassy (solid) elastic state. As molecular systems are cooled below their Tg, their viscosity increases by several orders of magnitude within a more or less narrow temperature range. In the glassy state, i.e. at temperatures below Tg, molecules are frozen in a state of extremely low translation mobility.

It is recognized by many experts in the field that it is this low molecular mobility of glassy molecular systems which is used to stabilize actives in a solid dosage form. Implicit in much of the literature is the converse, namely that at temperatures above Tg, the encapsulation of flavor molecules will be ineffective and hence the importance of creating solid flavor capsules by formulating polymeric matrices characterized by Tg values higher than the ambient surrounding temperature.

The physical state of an encapsulating matrix can thus be expressed by the difference of T-Tg, where T is the temperature surrounding the system, i.e. the extrusion temperature when reference is made to the encapsulation process, and the ambient or storage temperature, namely a temperature typically comprised between 10 and 30° C. when reference is made to the storage of the final product, after the end of the extrusion process.

When T is equal to Tg, the surrounding temperature corresponds to the glass transition temperature of the system. For negative values of the difference of T-Tg, the system is in the glassy state and, the more negative is the difference, the lower the molecular mobility is within the system. Conversely, in the rubbery state, i.e. when the difference of T-Tg is positive, the more positive is the difference, the less viscous is the system. Thus by varying either the surrounding temperature T or the glass transition Tg of a given system, the latter can be either liquefied or solidified.

The glass transition temperature of a matrix can usually be adapted as desired by combining a thermoplastic polymer of appropriate molecular weight with a solvent that is able to lower the viscosity and thus the Tg of the neat polymer by plasticization. As an example, water can be used to plasticize the more hydrophilic polymers whereas less polar solvents are used to plasticize more hydrophobic polymers.

The difference of T-Tg evolves during the different steps of an encapsulation process and is representative of the changes in the physical state of the system.

In the encapsulation processes described in the prior art, a flavor is dispersed in a polymer, usually a carbohydrate matrix, which is maintained in a plasticized liquid state by properly selecting the processing temperature and the plasticizer concentration to fulfill the requirements for a positive difference of T-Tg. More particularly, the plasticizer concentration, in the prior art processes, is such that the difference of T-Tg is positive and greater than 100° C. to maintain the flavor phase dispersed homogeneously in the carbohydrate melt as it is extruded through a die. Therefore, the product exiting the die possesses a Tg which is too low (product in a liquid state) to produce a solid once the product has been cooled to storage temperature. As a consequence, all the extrusion processes described in the prior art comprise a drying step following the extrusion, which raises the final Tg of the extruded product above the ambient or room temperature, i.e. above a temperature varying between about 10 and 30° C., so that the difference of T-Tg is negative when T is the ambient temperature, thus providing a solid free flowing system. Free flowing extruded carbohydrate particles are thus only obtained once the sign of the difference of T-Tg has changed from being positive to becoming negative at storage temperature. These prior art processes present the problem of providing at the end of the extrusion a molten mass which is not sufficiently viscous to solidify at temperatures varying between 10 and 30° C., once shaped into the final desired product. Consequently, all these processes require, following the extrusion, an additional concentration, dehydration or drying step aimed at increasing the Tg of the extruded product above 10 to 30° C. WO 01/25414 discloses a typical example of this kind of process.

Now, a post-extrusion dehydrating or drying step presents obvious drawbacks such as mainly losing a part of the active ingredient encapsulated.

WO 01/17372, the content of which is hereby included by reference, has provided a solution to the mentioned problem of post-extrusion drying, and discloses a process wherein the extruded product possesses, at the end of the extrusion step, a glass transition temperature Tg sufficiently high to be shaped directly at the die end to yield a solid granular product once the extruded product has been cooled to storage temperature, without requiring a post-extrusion drying step. Practically this effect is obtained, as described in the examples of said application, by starting the process with a solid product, such as a dry blend or a spray-dried product. In other words, in the solution provided by the invention described in WO 01/17372, a starting emulsion is dried before being extruded. However, while indeed avoiding the problem linked to a post-extrusion drying step as mentioned before, the known process starts with a solid product and thus comprises a pre-extrusion drying step. Now, the latter presents the known drawbacks of any drying step, i.e. that it favors a loss of a part of active ingredient present in the starting emulsion, thus decreasing the retention of said ingredient during the entire process and in the final product.

Therefore, in order to optimize the fix of active ingredient in the final product, and to improve its retention during an extrusion process, a pre-drying step is also best avoided.

Now, up to now, no prior art document has ever disclosed or suggested a process able to entirely dispense with any dehydration steps, be it either before or after the extrusion of an emulsion, thus optimizing the retention of active ingredient from the starting emulsion to the final extruded granular solid.

The process of the invention provides such a solution to the problems created by drying steps in conventional extrusion encapsulation methods.

SUMMARY OF THE INVENTION

Thus, the present invention relates to a process that unexpectedly does not require a dehydration step either before or after extrusion. More particularly, we have now been able to establish that by starting the process with a concentrated highly viscous liquid oil-in-water emulsion and by blending the latter with an appropriate polymer, it is possible to provide an extruded product with a high active loading and a glass transition temperature Tg at the end of the extrusion step sufficient to avoid any drying or dehydrating step after extrusion and to finely yield freely flowing glassy particles at the usual storage temperatures, i.e. at temperatures varying between about 10 and 30° C.

The present invention thus relates to a process for the preparation of a delivery composition, such as a granular hydrophobic or extruded delivery system, which comprises: a) preparing a concentrated highly viscous oil-in-water emulsion consisting of a hydrophobic ingredient or composition, water and a carrier, in a ratio defined according to the shaded area of FIG. 1 hereinbelow, by dispersing the hydrophobic ingredient or composition in an aqueous solution of the carrier; b) continuously blending by extrusion said highly viscous emulsion with a hydrophilic polymer and extruding the resulting blend through at least one die hole of predetermined size. Advantageously, the emulsion comprises at least 15% by weight of emulsifier relative to the total weight of the emulsion. The carrier can either consist of the emulsifier on its own, or can comprise the emulsifier in admixture with additional ingredients. In both cases, the emulsifier always represents at least 15% by weight of the emulsion. Practically, the shaded area of FIG. 1 is determined by proportions of 30% to 70% by weight of oil, 15% to 35% by weight of water and 15% to 35% by weight of carrier, relative to the total weight of the emulsion.

The blend produced at the end of the extrusion can be shaped into a free-flowing granular system at usual storage temperatures.

BRIEF DESCRIPTION OF THE DRAWING FIGURE

FIG. 1 is a component ternary phase diagram wherein the shaded area represents the proportions of active hydrophobic ingredient (O) (flavoring or perfuming ingredient or composition), carrier (C) and water (W) in the starting emulsion. Practically, the shaded area is determined by proportions of 30% to 70% by weight of oil, 15% to 35% by weight of water and 15% to 35% by weight of carrier, relative to the total weight of the emulsion.

DETAILED DESCRIPTION OF THE PREFERRED EMBODIMENTS

The viscous emulsion provided in step a) of the process is such that the difference of T-Tg is positive but kept at a minimum if T refers to usual storage conditions, i.e. to temperatures comprised between about 10 and 30° C. In other words, as explained above, the amount of water in the starting system is kept minimal and is able to provide, once blended with an appropriate hydrophilic polymer, a glass transition temperature Tg higher than the reference storage temperature T, such that as a consequence, neither pre-extrusion nor post-extrusion drying step is necessary in the encapsulation process.

The use of a minimum amount of water is a surprising solution in view of some prior art teachings. For instance, U.S. Pat. No. 4,689,235 outlines the importance of maintaining low extrusion pressures to maximize flavor retention and thus describes the use of plasticizers to reduce viscosity of the melt upon extrusion. Said document further discloses the need to ultimately raise the Tg of the extruded particles by post-extrusion drying. This drawback is now avoided by the process of the invention wherein the amount of water required to prepare the viscous emulsion in step a) is then used to plasticize the hydrophilic polymer added in step b), and used to increase the Tg of the emulsion above storage temperature T.

In a more general manner, many systems reported in the prior art rely on the use of starting mixtures of low viscosity, easier to formulate and to handle at low extrusion pressures (usually below $10 \times 10^5$ Pa), but unavoidably requiring after the extrusion, an additional step to adjust the glass transition temperature of the system to a value greater than between 10 and 30° C.

The process of the invention advantageously avoids any pre- or post-extrusion drying or dehydrating step by starting with a concentrated highly viscous emulsion containing a maximum of oil, a minimum of water and a high amount of emulsifier. The emulsion is characterized by a viscosity greater than $10^3$ cP. Other advantages of the process of the invention will appear in the following description as well as in the examples below.

The first step of the process according to the invention consists in preparing a concentrated highly viscous oil-in-water emulsion consisting of a hydrophobic ingredient or composition, water and a carrier, in a ratio defined according to the shaded area shown on the ternary diagram of FIG. 1, by dispersing the hydrophobic ingredient or composition in an aqueous solution of the carrier. This emulsion comprises at least 15% of emulsifier. What is intended here by "emulsifier" is either a single compound or a mixture of two or more ingredients as defined below.

In practicing the invention, the active ingredient, in particular the flavoring or perfuming ingredient or composition, is dispersed in step a) in a viscous aqueous polymer solution with the help of for example high pressure homogenization, or a colloid mill.

In a first embodiment of the invention the carrier consists only of the emulsifier and thus represents a proportion of at least 15% by weight of the emulsion. In another embodiment, the carrier may comprise, further to the emulsifier (which always represents at least 15% by weight of the emulsion), additional ingredients. Therefore, for instance, the carrier may comprise a mixture of an emulsifier with a water-soluble monomer, oligomer or polymer. Examples of the latter include disaccharides such as sucrose, organic acids such as citric acids, hydrogenated carbohydrates such as hydrogenated corn syrup, polysaccharides or gums such as maltodextrin, agar or carrageenan and mixtures thereof.

In another embodiment, the carrier may also comprise additional ingredients such as a co-solvent in which the flavor is not, or is only partially, soluble, for instance glycerol or propylene glycol; or a co-surfactant such as lecithin or an ester of fatty acids, as well as other additives such as colorants, or antioxidants.

The emulsifier present in a proportion of at least 15% in the emulsion can be selected from the group consisting of gums or hydrocolloids comprising for instance gum acacia and gelatin, or chemically modified biopolymers comprising octenyl succinate starch hydrolysates, or food-grade cellulose ethers, or monomeric surfactants comprising sucrose, or sorbitol esters of fatty acids or lecithins. The emulsifier can be in the form of a single ingredient selected in these groups, as well as in the form of a mixture of several ingredients selected therein. The emulsifier is preferably a water-soluble polymer. In a particular embodiment, the water-soluble polymer is selected from the group consisting of gum acacia, gelatine and octenyl succinate starch hydrolysate.

The terms hydrophobic ingredient or composition, also referred to as "active ingredient" can designate a single hydrophobic compound or a composition, such as flavors, fragrances, pharmaceuticals or other ingredients, which one wishes to encapsulate. Preferably, the process of the invention is advantageously employed to manufacture encapsulated volatile or labile flavoring or perfuming ingredients or compositions, in particular hydrophobic liquids, soluble in organic solvents but only very weakly soluble in water. More particularly, the flavoring or perfuming ingredient or composition encapsulated by the process of the invention is characterized by a Hildebrand solubility parameter smaller than 30 $[MPa]^{1/2}$. The aqueous incompatibility of most flavors and perfumes can be in fact expressed by means of Hildebrand's solubility parameter $\delta$, which is generally below 25 $[MPa]^{1/2}$, while for water the same parameter is of 48 $[MPa]^{1/2}$, and of 15-16 $[MPa]^{1/2}$ for alkanes. This parameter provides a useful polarity scale correlated to the cohesive energy density of molecules. For spontaneous mixing to occur, the difference in $\delta$ of the molecules to be mixed must be kept to a minimum. The Handbook of Solubility Parameters (ed. A. F. M. Barton, CRC Press, Boca Raton, 1991) gives a list of $\delta$ values for many chemicals as well as recommended group contribution methods allowing to calculate $\delta$ values for complex chemical structures.

The terms "flavor or fragrance compound or composition" as used herein, are thus deemed to define a variety of flavor and fragrance materials of both natural and synthetic origin. They include single compounds and mixtures. Natural extracts can also be encapsulated by means of the process of the invention; these include e.g. citrus extracts, such as lemon, orange, lime, grapefruit or mandarin oils, or essential oils of spices, amongst other. Specific examples of such flavor and perfume components may be found in the current literature, e.g. in Perfume and Flavour Chemicals, 1969, by S. Arctander, Montclair N.J. (USA); Fenaroli's Handbook of Flavour Ingredients, CRC Press or Synthetic Food Adjuncts by M. B. Jacobs, van Nostrand Co., Inc.. They are well-known to the person skilled in the art of perfuming, flavoring and/or aromatizing consumer products, i.e. of imparting an odor or taste to a consumer product.

At a reference storage temperature varying approximately between 10 and 30° C., the emulsion prepared in step a) is a viscous liquid characterized by a positive difference of T-Tg that is less than 100° C., and preferably is less than 50° C.

This viscous emulsion is then blended in step b) with a hydrophilic polymer by using a continuous processing equipment, namely an extruder. This manner of mixing the emulsion and the hydrophilic polymer in a continuous process is known in the prior art, and disclosed for instance in EP 1090647, the contents of which are hereby included by reference. Possible equipments used to feed the emulsion into the extruder include for instance piston pumps, Moneau pumps, gear pumps or side extruders.

Then, the extrusion of the blend requires a usual extruding apparatus. A commercially acceptable extruding apparatus is that under the trade name of Clextral BC 21 twin-screw extruder equipped with a cutter knife allowing to chop the melt at the die exit, when it is still in a plastic condition. However, extruding apparatus are not limited to the twin screw variety and may also include, for example, single screw, ram, or other similar extrusion methods.

At the die face, the temperature of the exiting thermoplastic mass is preferably maintained between 90 and 120° C., although higher or lower temperatures are possible. The upper temperature limit is set by the boiling point of the volatile molecules contained by the emulsion, namely water and the flavor or fragrance ingredient or composition. The lower temperature limit is set by the desire to maximize oil retention by maintaining the system as fluid as possible during its extrusion. To this end, the extrusion process is carried out at different T-Tg values, with the difference between the processing temperature and the glass transition temperature of the system preferably being between 50 and 100° C. In this way the emulsion is carefully and homogeneously blended with a polymer, which provides a system having a satisfactory Tg for the purpose of the invention.

The hydrophilic polymer blended in step b) to the viscous emulsion is a thermoplastic polymer characterized typically by a Hildebrand solubility parameter $\delta$ greater than 20 $[MPa]^{1/2}$, preferably above 25 $[MPa]^{1/2}$ and more preferably above 30 $[MPa]^{1/2}$. As non limiting examples, possible polymers include carbohydrate or protein biopolymers such as starch or gelatin and their hydrolyzates, semi-synthetic polymers such as cellulose ethers as well as synthetic polymers such as poly(vinyl alcohol). The Handbook of Polymers (eds. J. Brandrup, E. H. Immergut and E. A. Grulke, 4th ed., Wiley Interscience, New York, 1998) gives an extensive list of potential hydrophilic polymer candidates ranked in order of increasing polarity using the Hildebrand solubility parameters. Other suitable hydrophilic polymers including hydrocolloids and gums such as for instance agar and carrageenan are cited in reference texts such as H. Scherz, Hydrokolloide: Stabilisatoren, Dickungs-und Geliermittel in Lebensmittel, Band 2 der Schriftenreihe Lebensmittelchemie, Lebensmittelqualität, Behr's VerlagGmbH & Co, Hamburg, 1996. The ingredient added in step b) can also be admixed with other water-soluble ingredients or surface active ingredients such as the polymeric, oligomeric or monomeric emulsifiers cited as possible emulsifiers of the emulsion prepared in step a). Optional ingredients usually used in extrusion processes such as lubricants, can also be admixed with the hydrophilic polymer. A more detailed description here is not necessary, a skilled person in the art being well aware of how and when to use such ingredients in an extrusion process.

During the extrusion process, the blend provided by the emulsion and the hydrophilic polymer is forced through die holes with predetermined diameter ranging from 0.250 to 10 mm and preferably from 0.5 to 1.0 mm, although higher or lower die hole diameters are also possible. The resulting extrusion pressures measured in the die head are comprised between 0.1 and $100 \times 10^5$ Pa, preferably between 1 and $10 \times 10^5$ Pa. The die head is equipped with a rotating cutter-knife or any other cutting device allowing to chop the melt as it exits from the die, preferably when it is still plastic as disclosed in WO 01/17372, the content of which is hereby included by reference. The shaping of the extruded product as it is still plastic, presents the advantage of minimizing the surface oil of the final product. Furthermore, the granular delivery system advantageously prepared by the process according to the invention has an optimized retention of perfume or flavor ingredient.

In a preferred embodiment, the composition of the extruded granules, on a weight basis, is of 3 to 33% oil, 2 to 20% water, 47 to 97% solids meant to include all the other ingredients used in step a) and b).

The product at the end of the extrusion process has a Tg which is above storage temperature, and more generally comprised between 30 and 60° C., although it can be higher depending on the polymeric hydrophilic material used. Therefore, at the end of this extrusion process involving no dehydration step to reduce the amount of solvent water needed for the formation of the initial oil-in-water emulsion prepared in step a), the Tg is sufficiently high to yield a free flowing granular emulsion which is solid at usual storage temperatures. If the Tg is in the low-end limit of the allowable temperature domain, an anti-caking agent can be added to enhance the flowability of the granules.

The granular products produced by the process according to the invention can be used to impart or modify the organoleptic properties of a great variety of edible or perfumed end products. In the field of flavors, these consumer products may include foods, beverages, pharmaceuticals and the like. On the other hand, in the field of perfumery, the granular solids according to the invention may be advantageously incorporated in a perfuming composition to be added to functional products such as detergents or fabric softeners. Other functional perfumery applications such as soaps, bath or shower gels, deodorants, body lotions, shampoos or other hair-care products, household cleansers, cleaning and deodorizing blocks for toilet tanks, may constitute suitable applications for the products prepared by the process according to the invention. These examples are of course neither exhaustive nor restrictive of the invention.

The concentrations in which the extruded solids of the invention can be incorporated in such consumer products vary in a wide range of values, which are dependent on the nature of the product to be flavored or perfumed. Typical concentrations, to be taken strictly by way of example, are comprised in a range of values as wide as from a few ppm up to 5 or even 10% of the weight of the flavoring or perfuming composition or finished consumer product into which they are incorporated. The invention will now be illustrated by way of the following examples, but is not limited to these examples. Temperatures are given in degrees centigrade and abbreviations have the meaning common in the art.

EXAMPLES

Examples 1 to 4

Preparation of Granular Flavor Delivery Systems According to the Process of the Invention An oil-in-water emulsion composed of the following ingredients was prepared:

| Ingredients | Parts by weight |
| --- | --- |
| Orange oil[1] | 50 |
| Water | 25 |

| Ingredients | Parts by weight |
| --- | --- |
| Hi-Cap ® 100[2] | 23 |
| Glycerol | 2 |
| Total | 100 |

[1] orange flavor 51941 A; origin: Firmenich SA, Geneva, Switzerland
[2] origin: National Starch, USA The emulsion was injected into an extruder by means of a gear pump and blended with maltodextrins of different molecular weights, in four different experiments, as reported in Table 1 below. In the four examples, the starting emulsion represented 17% by weight of the final extruded product, and maltodextrin, 83% by weight of the final product.

For each experiment, the emulsion-maltodextrin blend was extruded through a 1 mm die and granulated at the die face using a rotating cutter. Some additional water was injected in Examples 3 and 4.

Table 1 reports, for each final product, the oil content (O), the water content (W) and the glass transition temperature (Tg). It appeared that the retention of orange oil, as determined by steam distillation technique, was close to theoretical 8.3% expected at 100% retention.

TABLE 1

Oil content, Water content and Tg values of four delivery systems prepared according to the process of the invention

| Example | Maltodextrin | Oil content [%] | Water content [%] | Tg [° C.] |
| --- | --- | --- | --- | --- |
| 1 | Glucidex IT 19[1] | 8.3 | 7.5 | 49 |
| 2 | Glucidex 12 Maltodextrin[1] | 8.1 | 8.4 | 54 |
| 3 | Glucidex 6[1] | 7.9 | 12.3 | 45 |
| 4 | Paselli SA2[2] | 8.1 | 15.1 | 26 |

[1] origin: Roquette, France
[2] origin: Avebe, Netherlands

Example 5

Preparation of a Granular Perfume Delivery System According to the Process of the Invention An oil-in-water emulsion composed of the following ingredients was prepared:

| Ingredients | Parts by weight |
| --- | --- |
| Perfume[1] | 46.7 |
| Water | 23.2 |
| Hi-Cap ® 100[2] | 30.0 |
| Colorant[3] | 0.1 |
| Total | 100.0 |

[1] ref. 129022B; origin: Firmenich SA, Geneva, Switzerland
[2] origin: National Starch, USA
[3] origin: CIBA, Switzerland The emulsion was injected into an extruder, as described in Example 1, and blended with a mixture of maltodextrin and lubricants of the following composition:

| Ingredients | Parts by weight |
| --- | --- |
| Maltodextrin 2DE | 98 |
| 1:1 Mixture of Citrem ®[1)]/fractionated coconut oil[2)] | 2 |
| Total | 100 |

[1)]origin: Danisco, Denmark
[2)]origin: Stearinerie-Dubois

The starting emulsion represented 19% by weight of the final extruded product. The blend was extruded using a 2 mm die and granulated at the die face using a rotating cutter.

The free flowing powder obtained at the end of the process was characterized by a water content of 13.45% and a glass transition temperature of 34.9°. Oil losses were minor.

What is claimed is:

1. A process for the preparation of a delivery composition, which comprises:
    a) preparing a concentrated highly viscous oil-in-water emulsion consisting of a hydrophobic component in an amount of from 30 to 70%, water in an amount of from 15 to 35% and a carrier in an amount of from 15 to 35% by dispersing the hydrophobic component into a solution of the carrier and water, wherein the emulsion has at least 15% of emulsifier, all percentages being defined by weight, relative to the total weight of the emulsion; and
    b) continuously blending by extrusion said highly viscous oil-in-water emulsion with a hydrophilic polymer and extruding the resulting blend through at least one die hole of predetermined size so as to obtain the composition.

2. The process according to claim 1, wherein the delivery composition comprises a granular hydrophobic ingredient or a delivery system, and the hydrophobic component is an ingredient or composition.

3. The process according to claim 1, wherein the carrier consists of the emulsifier.

4. The process according to claim 1, wherein the carrier comprises the emulsifier in admixture with a water-soluble monomer, oligomer or a polymer.

5. The process according to claim 1, wherein the emulsifier is a water-soluble polymer.

6. The process according to claim 5, wherein the water-soluble polymer is selected from the group consisting of gum acacia, gelatine and octenyl succinate starch hydrolysate.

7. The process according to claim 1, wherein the hydrophobic ingredient or composition is a flavoring or perfuming ingredient or composition having a Hildebrand solubility parameter δ that is smaller than 30 $[MPa]^{1/2}$.

8. The process according to claim 1, wherein the hydrophilic polymer is a thermoplastic polymer that has a Hildebrand solubility parameter δ that is greater than 20 $[MPa]^{1/2}$.

9. The process according to claim 1, which further comprises chopping the extruded blend provided at the end of step b) directly as it exits the die hole.

10. The process according to claim 1, wherein the emulsion prepared in step a) possesses a glass transition temperature Tg such that the difference of T-Tg is positive but below 100° C., when T is a storage temperature between 10 and 30° C.

11. The process according to claim 10, wherein the difference of T-Tg is positive but below 50° C.

12. The process according to claim 1, wherein the oil-in-water emulsion has a viscosity that is greater than $10^3$ cP.

13. A delivery composition obtainable by the process according to claim 1.

14. The delivery composition according to claim 13, in the form of a granular hydrophobic ingredient or a delivery system.

15. A process for the preparation of a delivery composition, which comprises:
    a) preparing a concentrated highly viscous oil-in-water emulsion consisting of a hydrophobic component in an amount of from 30 to 70%, water in an amount of from 15 to 35% and a carrier in an amount of from 15 to 35% by dispersing the hydrophobic component into a solution of the carrier and water, wherein the emulsion has at least 15% of emulsifier, all percentages being defined by weight, relative to the total weight of the emulsion; and
    b) continuously blending by extrusion said highly viscous oil-in-water emulsion with a hydrophilic polymer and extruding the resulting blend through at least one die hole of predetermined size so as to obtain the composition directly from the die hole without having to conduct a water removal step.

16. The process according to claim 1 wherein the delivery composition is in the form of extruded granules containing 3 to 33% of the hydrophobic component, 2 to 20% water and 47 to 95% of solids including the carrier, all percentages based on the weight of the granules.

17. The delivery system according to claim 13 in the form of extruded granules containing 3 to 33% of the hydrophobic component, 2 to 20% water and 47 to 95% of solids including the carrier, all percentages based on the weight of the granules.

* * * * *